US007860521B2

(12) United States Patent
Chen et al.

(10) Patent No.: US 7,860,521 B2
(45) Date of Patent: Dec. 28, 2010

(54) SYSTEM AND METHOD FOR MINIMIZING INTER-COMMUNICATIONS SYSTEM MOBILE STATION-TO-MOBILE STATION INTERFERENCE

(75) Inventors: Xiang Chen, Rolling Meadows, IL (US); Xiaowei Jin, Palatine, IL (US); James F. Kepler, Buffalo Grove, IL (US); Stephen L. Kuffner, Algonquin, IL (US); Peijuan Liu, Palatine, IL (US); Ravindra P. Moorut, Port Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 545 days.

(21) Appl. No.: 11/964,386

(22) Filed: Dec. 26, 2007

(65) Prior Publication Data

US 2009/0170542 A1 Jul. 2, 2009

(51) Int. Cl.
*H04B 15/00* (2006.01)
(52) U.S. Cl. ............... 455/501; 455/41.2; 455/517; 455/63.1
(58) Field of Classification Search ............ 455/501, 455/41.2, 446, 63.1, 67.13; 370/294, 347
See application file for complete search history.

(56) References Cited

U.S. PATENT DOCUMENTS

| 6,882,851 | B2 | 4/2005 | Sugar et al. | |
|---|---|---|---|---|
| 7,313,366 | B1 * | 12/2007 | Bristow | 455/63.1 |
| 2002/0105918 | A1 * | 8/2002 | Yamada et al. | 370/294 |
| 2002/0164989 | A1 * | 11/2002 | Skillermark et al. | 455/446 |
| 2005/0059347 | A1 | 3/2005 | Haartsen | |
| 2005/0181823 | A1 | 8/2005 | Haartsen | |
| 2006/0002323 | A1 | 1/2006 | Hildebrand et al. | |
| 2007/0054624 | A1 * | 3/2007 | Kashiwagi | 455/67.13 |

FOREIGN PATENT DOCUMENTS

| EP | 0859490 A2 | 8/1998 |
|---|---|---|
| WO | 0199454 A1 | 12/2001 |
| WO | 2007000721 A2 | 1/2007 |
| WO | 2007051140 A2 | 5/2007 |

OTHER PUBLICATIONS

PCT International Search Report and Written Opinion Application No. PCT/US2008/086908—Dated Apr. 24, 2009—15 pages.
IEEE 802.16 Part 16: Air Interference for Fixed and Mobile Broadband Wireless Access Systems—Dated May 18, 2007—73 pages.

* cited by examiner

*Primary Examiner*—Edward Urban
*Assistant Examiner*—Golam Sorowar

(57) ABSTRACT

A system and method for minimizing inter-communications system mobile-to-mobile station interference includes a plurality of base stations (BS A and BS B) and a plurality of mobile stations (MS A and MS B) each communicating with a base station using a first mode of communication. A first mobile station (MS A) sends a message using a second mode of communication upon detecting interference with another mobile station (MS B) to determine the source of the interference. Once determined, the first mobile station (MS A) communicates with its base station (BS A) which, in turn, communicates with the second mobile station's base station (BS B) using a back haul network. The second mobile station's base station (BS B) may then instruct the second mobile station (MS B) to alter its transmission characteristics based upon instructions from the second base station (BS B) in order to reduce interference and improve overall communications quality.

17 Claims, 3 Drawing Sheets

SYSTEM AND METHOD FOR MINIMIZING INTER-COMMUNICATIONS SYSTEM MOBILE STATION-TO-MOBILE STATION INTERFERENCE

FIELD OF THE INVENTION

The present invention relates generally to two-way radio communications and more particularly to interference mitigation in wireless networks utilizing unicast, multicast, and broadcast communications.

BACKGROUND

When two communications systems use adjacent segments of frequency spectrum, these stations may interfere with one another due to unwanted emissions or receiver overload. Depending on whether the systems involved are utilizing frequency division duplex (FDD) protocols, time division duplex (TDD) protocols, or combinations thereof, there are up to four (4) interference scenarios that are possible, i.e., base station (BS) interfering with mobile stations (MS), BS interfering with BS, MS interfering with BS, and MS interfering with MS.

As seen in FIG. 1A, there are two types of FDD systems whose systems are separate in frequency separated by some duplex frequency separation gap. First, the FDD A and FDD B system show up-link (UL) interference where a MS of FDD A interferences with a BS of FDD B. Similarly in the downlink (DL), the base station of FDD A may interfere with a mobile station in FDD B, and the base station of FDD B may interfere with a mobile station on FDD A.

As shown in FIG. 1B, when the frequency gap between the uplink of FDD A and the downlink of FDD B is relatively small, the base station of FDD B may interfere with the base station of FDD A, and the mobile station of FDD A may interfere with the mobile station of FDD B. Similarly in FIG. 1C, an interference example is shown using a combination of an FDD system and a TDD system where the TDD system transmits UL and DL data on the same frequency. In this example, on the UL side, each of the four different interference scenarios are shown, where a mobile station of FDD A interferes with the TDD base station or a TDD mobile station. Also, the FDD base station may be interfered with by the TDD base station or a TDD mobile station. Similarly, on the DL side, the FDD base station can interfere with the TDD base station or TDD mobile station. Also, an FDD mobile station can be interfered with by the TDD base station or mobile station.

Typically among these four interference scenarios, the MS-to-MS scenario tends to be the most difficult to solve due to the cost, size and weight constraints of the mobile station. Additionally, the mobile stations are at relatively random locations where signal strength between devices is continually changing. One method of minimizing such interference between devices involves synchronizing the two TDD systems and/or separating the two FDD systems in frequency. However, interference can still be problematic in cases where an FDD system is in proximity to a TDD system or the frequency gap between the uplink of one FDD system and the downlink of another FDD system is relatively small. Thus, a solution for solving the MS-to-MS interference problem is needed.

There are several ways to mitigate MS-to-MS interference. One technique involves using filters in both the transmit and receive chains of the mobile device. A disadvantage to this technique is that it increases cost, size, and weight of the mobile device. Another common approach is to utilize a "guard" band or frequency gap between the systems. Generally, this is a static approach as the width of the guard band is determined before the deployment of the systems. The main drawback of this approach is that the guard band size may be large if traditional separation criteria are used. For example, if two Worldwide Interoperability for Microwave Access (WiMAX) systems are operating on adjacent spectrum blocks, typically a 1 dB desensitization criteria for two mobile stations separated by 1 meter could require in excess of 15 MHz of guard band. Thus, this technique can require the non-use of valuable frequency spectrum which often is not a viable alternative.

Additionally, for two coexisting TDD systems, time synchronization can be employed to reduce the number of interference scenarios. If the frame duration and uplink/downlink split are synchronized, there will be no base station to base station interference or mobile station to mobile station interference. Cognitive radio concepts can also be used to mitigate the mobile station-to-mobile station interference. In general, cognitive systems are able to adapt their modulation, power and frequency to enable spectrum sharing with other systems. This may involve the inter-system communication to exchange signaling or share information (i.e., spectrum usage information) in a coordinated manner. Intersystem communication is used in the IEEE 802.16(h) standard for enabling coexistence of license-exempt IEEE 802.16 systems. Those skilled in the art will recognize that it would be ideal if an MS could differentiate high interference from deep channel fading, which impact the received signal-to-noise ratio (SNR). If the MS could check its received signal power as well as its received SNR; and if the received signal strength becomes lower, this might be due to channel fading. If the received the signal strength maintains consistent while received SNR becomes lower, this might be due to high amounts of adjacent interference.

Also, time-sharing techniques have also been used to enable system coexistence between two or more communication systems. These shared techniques use a shared broadcast control channel for multiple radio systems to share the same frequency band without causing interference to one another. In the shared broadcast channel, each system in turn broadcasts its information, such as carrier frequency, bandwidth, duty cycle, transmit power level, and the like. In this way, when one system is active, other systems refrain from transmission. An ad hoc control protocol was invented to enable different types of radio communication devices to communicate spectrum usage information to one another using a common signaling format in order to achieve harmonious sharing of an unlicensed or shared radio spectrum.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1A:
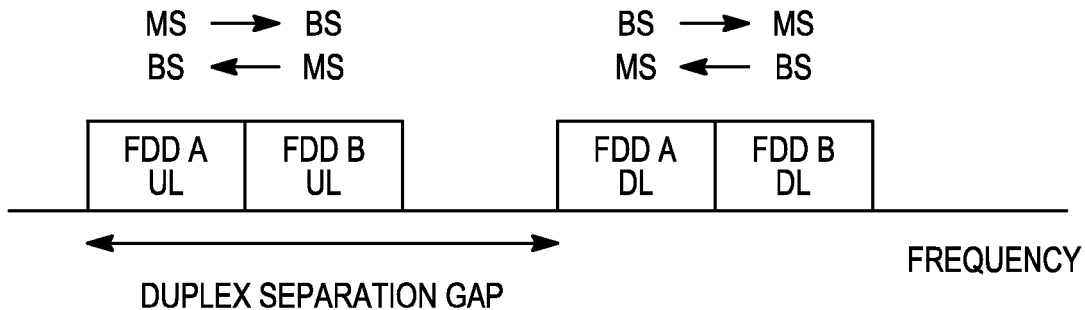
FIGS. 1A, 1B, and 1C are diagrams illustrating various interference situations between mobile stations and/or base stations.
Figure 1B:
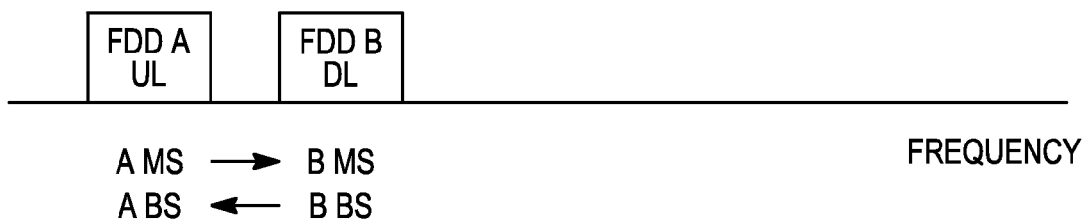
Figure 1C:
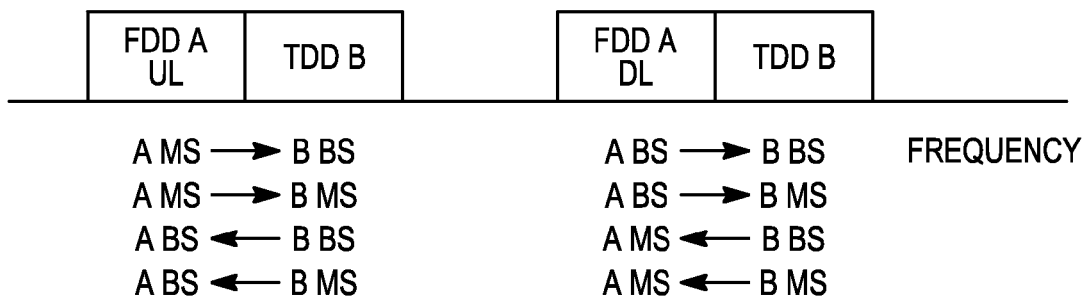

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a method and apparatus for enabling unicast, multicast, and broadcast traffic flows over hybrid multicast capable and non-multicast capable radio access networks (RANs). Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

In that there are no solutions readily available for solving MS-to-MS interference problems between two communication systems, particularly two licensed and operator-managed systems of which particularly one is an FDD system and the other a TDD system, the present invention works to solve these problems. Although prior art concepts typically use a common broadcast/control channel to share spectrum usage information among different devices. The present invention uses a common channel that is a part of the unlicensed or shared frequency band which typically would not be available as a portion of "licensed" frequency spectrum. Moreover, by sharing spectrum usage information with one another, the radio devices are able to self-regulate their own transmission pattern.

Accordingly, the present invention is directed to a timesharing technique used with two co-located wireless radio systems such as a wide area local area network (WLAN) and Bluetooth to share the common channel without overlapping in time. This is achieved through the exchange of channel occupancy information such as whether a transceiver is active, and when an idle transceiver must access the channel. The invention further includes a method of operating a first communication environment, where communication resources for communications according to a first communication standard are used for communications according to a second communications standard. Transmission gaps are located in the first communication standard, and the second communication system seizes these gaps as opportunities for transmission. This scheme is applicable within the context of wideband code division multiple access (WCDMA) and time division multiple access global system for mobile communications or general packet radio service (TDMA GSM/GPRS) coexistence and is implemented within the BS equipment.

When two communications systems interface, those MS stations that are affected by the interference might be referred to as "victim" mobile stations as they may suffer the detrimental effects of this interference. These victim MS in an MS-to-MS interference scenario will obtain the interfering MS(s) identity and related information through communication carried over a wireless technology that might be different from the ones currently used by the MSs in their primary communication. The obtained information can then be communicated to the victim MS's serving BS and further to the interfering MS(s) serving BS, which may then redirect the interfering MS's transmission to avoid and/or alleviate interference.

Figure 2:
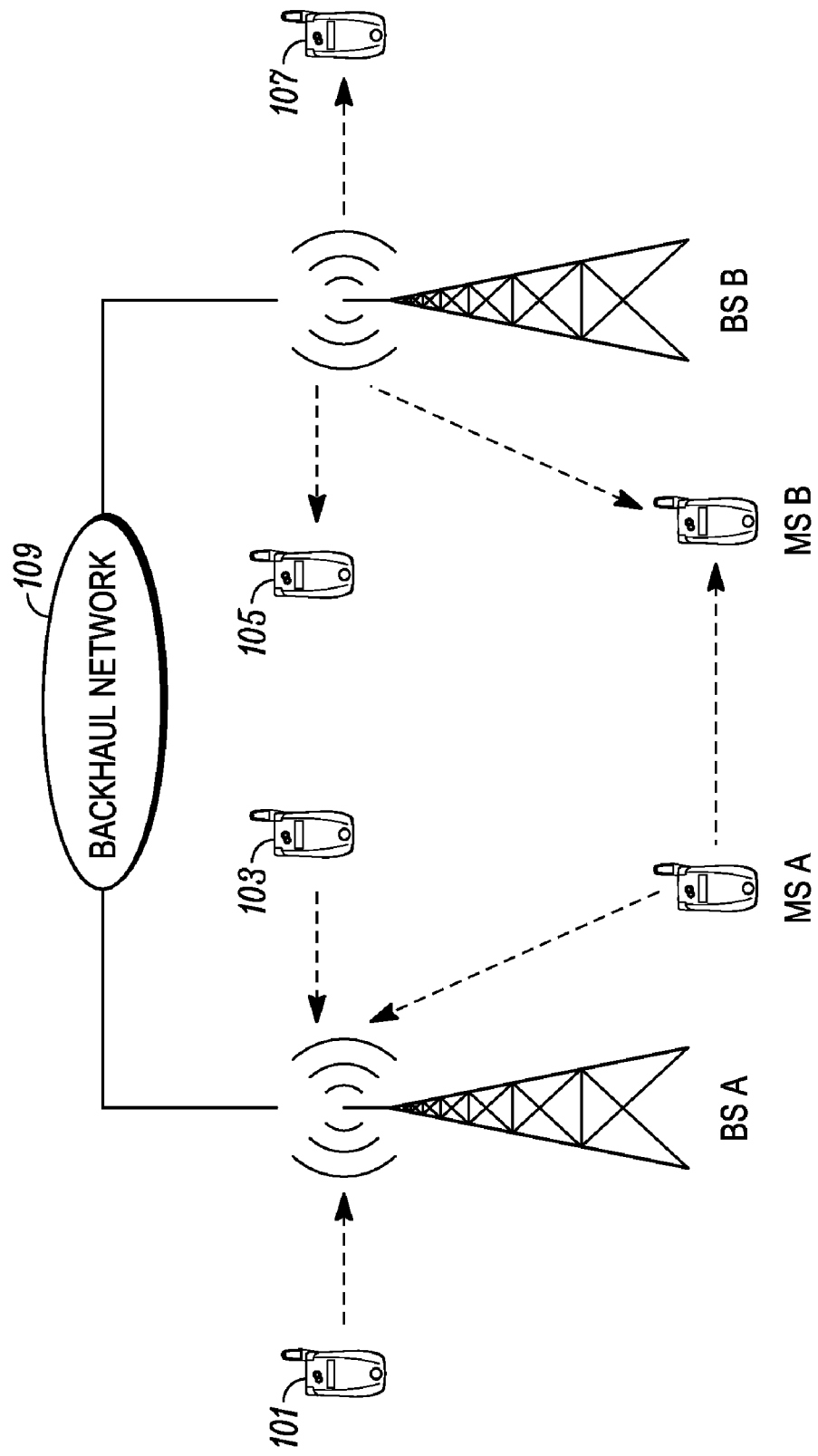
FIG. 2 is a block diagram illustrating interference mitigation in accordance with an embodiment of the invention.

FIG. 2 is a block diagram illustrating interference mitigation 100 in accordance with an embodiment of the invention. In this example, there are two communication systems, namely system A and system B. In system A, MS A is transmitting to BS A, while in system B, MS B is receiving from BS B. Mobile stations 101, 103 are in communication with BS A while mobile stations 105, 107 are in communication with BS B. The two systems may use the same or different wireless technologies including but not limited to, Global System for Mobile Communications (GSM), code division multiple access (CDMA), Universal Mobile Telecommunications System (UMTS), or Worldwide Interoperability for Microwave Access (WiMAX).

In this example, MS A and MS B are in close proximity but are not yet aware of each other's presence. If neither station is experiencing detrimental interference levels, i.e. both stations are receiving relatively high quality signals, then the systems are adequately coexisting and no corrective measures need be taken. However, if MS B detects high interference from MS A, though it does not yet know the identity of the interferer corrective measures are required. The interference may be detected in several ways, such as the detection of a strong adjacent channel signal via a pre-selectivity power detector, or the detection of splatter and intermodulation mixing products observed during unused time slots, inferred from poor quality indicators that are not expected given channel estimates or signal strength indications.

In order to attempt to identify the interferer so that subsequent actions can be taken, the victim MS (e.g., MS B) shall initiate a brief communication using an alternate wireless technology that is different from that used by system A or B in order to avoid interfering with the primary communications going on in system A or B. Good candidates for such a technology would include, but are not limited to, Bluetooth or Wi-Fi in the ad hoc mode. Both of these technologies are known in the art and are good selections since they are aimed at short-range communications that are typically in a range less than 100 meters. The victim mobile must determine any nearby interferers so the short range is desirable. Another advantage of the invention is that MSs and handsets, such as a cellular phone, typically include Bluetooth and/or Wi-Fi capabilities or other communication technology. It should be mentioned that this alternate wireless technology may also be the primary technologies with some sort of adaptation, such as power and modulation, as long as it does not impact the ongoing primary communication.

The communication between MS A and MS B is ad hoc in nature and generally only involves one communications handshake. For example, MS B may broadcast a message saying that it is experiencing interference on its operating frequency. Where MS A, after receiving the query, determines if it is transmitting and, if so, then determines its operating frequency. If such analysis confirms that it may be the interferer, it then responds to the broadcast. If there is more than one interfering MS, they all will reply to the broadcasting station or node.

The information contained in MS A's reply should include its identity (or pseudo-identity for security purposes) as well as other useful information, such as its associated operator name and/or the identity of its serving BS (e.g., BS A). Here an ID may be an IP address, media access control (MAC) address, or, in particular, International Mobile Subscriber Identity (IMSI) for a GSM or UMTS phone. It should be noted that the identification of BS A may not be needed as it could be derived from the identification of MS A. However, supplying this information may speed the resolution of the interference issue. For security reasons, the information passed between the MSs may be encrypted in order to enhance security.

Once MS B collects all the useful information directly from MS A, it will then forward it to its serving BS (BS B). Then, BS B communicates to BS A, over a wired or backhaul network 109 the information collected from MS A and all necessary information regarding its transmission to MS B. This may include scheduling information, such as time, frequency, and power and/or the highest inference level that MS B can tolerate. It should be noted that depending on the inter-system communication protocol established between system A and system B, the communication between BS A and BS B may involve interface entities located in each system and be secured through security measures, such as authentication and encryption.

Once BS A is aware of the interference problem and given all the information, it can then change MS A's transmission pattern and/or characteristics in any number of ways so that MS A will completely avoid or significantly reduce its interference to MS B. For instance, it can schedule MS A transmission in a different time slot or frequency channel away from that currently occupied by MS B; it can ask MS A to change its modulation and coding scheme (MCS) so that MS A can transmit at a lower power that still ensures the reception quality in BS A but causes less interference to MS B. Depending on the traffic type carried by MS A, it can even delay MS A's transmission in a graceful manner if MS A is transmitting delay-tolerant data traffic. It can be seen that the changes of MS A's transmission pattern may occur at the MAC layer or the PHY layer or both layers.

In addition, BS B can play a more active or collaborative role. So far in the previous descriptions, BS B has played a very limited role in that it does little except for forwarding all the information needed by BS A to change MS A's transmission pattern. As a result, BS B's transmission to MS B stays the same. However, there is no reason to restrict BS B's role to an information relay only. Specifically, BS B could also change the pattern of its transmission to MS B in the same way as performed by BS A. This is especially helpful if the transmission pattern changes effected by BS A are limited and hence cannot solve the interference problem completely due to its own resource constraints in terms of, but not limited to, available frequency channels or time slots. As an example, suppose MS A is transmitting voice traffic and BS A cannot move its transmission to another time slot or frequency channel, nor can BS A lower MS A's transmit power. In this case, BS B needs to instruct MS B to receive in a different time slot or frequency channel, or switch to a more robust MCS that requires lower SNR. Thus, with the support of an alternate wireless technology (e.g., Bluetooth or Wi-Fi), an embodiment of the present invention provides a mechanism to dynamically move mobiles either spectrally or temporally to solve the MS-to-MS interference problem.

Figure 3:
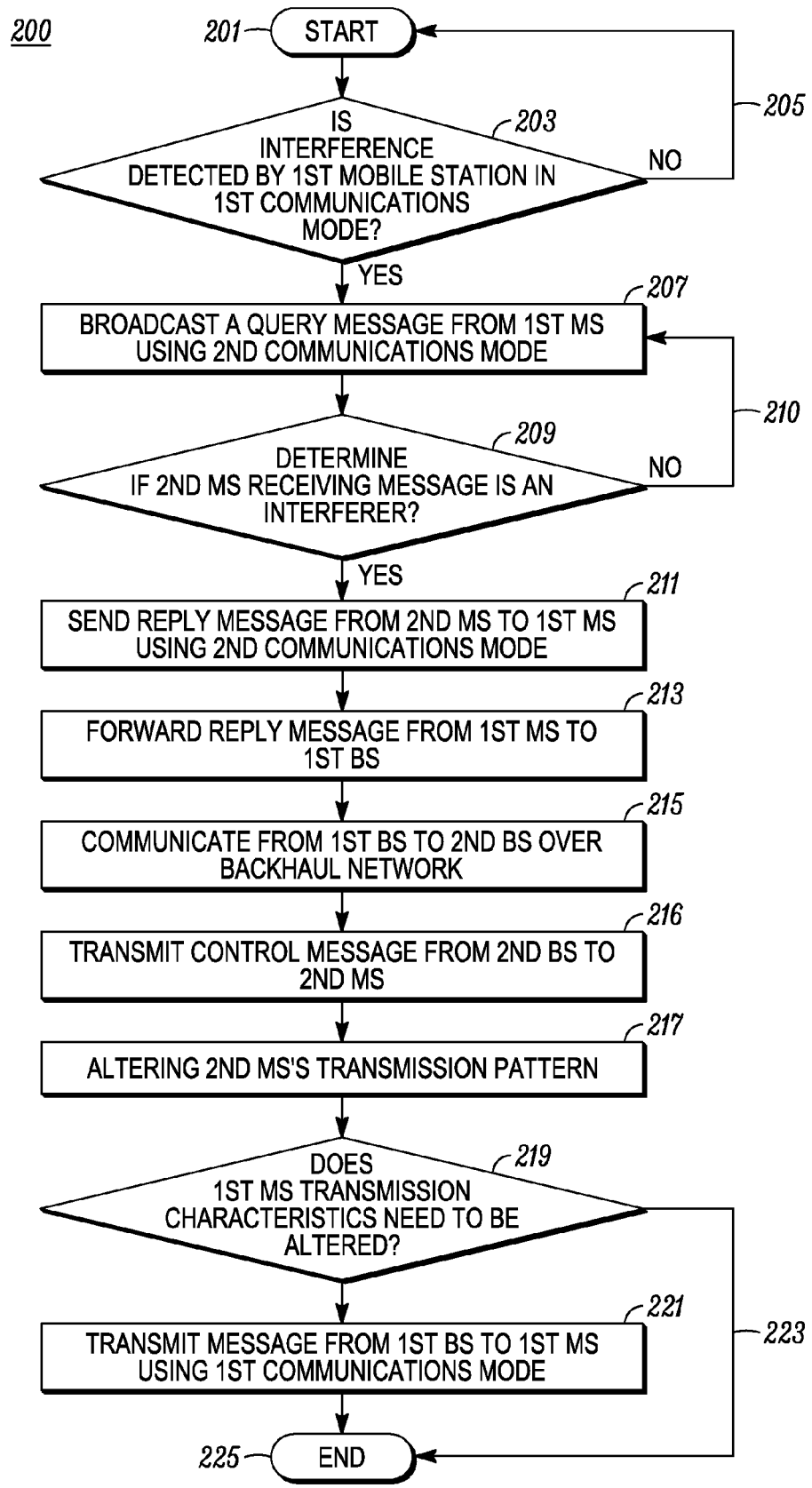
FIG. 3 is a flowchart diagram illustrating interference mitigation in accordance with an embodiment of the invention.

FIG. 3 is a flowchart diagram illustrating an interference mitigation method 200 in accordance with the invention. The process begins 201 where a determination is made whether a high interference level is determined by a first mobile station 203. If not, this process continues until a high interference level is detected 205. Once detected, a query message is broadcast 207 using an alternative mode, such as Bluetooth or WiFi, to determine the identity of the interference mobile station. If a second mobile station is the interferer, then it replies to the query message sent by the first mobile station with a reply message 209. If no message is received, than another query message is broadcast 210.

If received a reply message can be sent from the second or interfering mobile station to the first mobile station 211 using the second or alternative communications mode. This reply message is then forwarded by first mobile station to its serving first base station 213. Subsequently, the first base station communicates the reply message together with all necessary information regarding the first mobile station's transmission characteristics to the second base station servicing the second mobile station 215 via a backhaul or other network. The second base station then transmits a control message to the second mobile station 216. The second mobile station's transmission pattern may then be altered 217 where a determination is made if the first mobile station's transmission pattern must also be altered 219 to further mitigate interference. If necessary, the second mobile station's transmission characteristics may be altered 221 where the process ends 225. If no further alternation is necessary 223, then the process ends 225 once the second mobile station's transmission characteristic are changed.

Thus, an embodiment of the present invention utilizes a method for mitigating inter-communications system mobile-to-mobile station interference and includes the steps of providing a plurality of mobile stations and at least a first base station and second base station utilizing a first mode of communications. A predetermined level of interference is then detected at a first mobile station in a first network provided by a second mobile station in a second network. A query message is transmitted from the first mobile station using a second mode of communication. A query message is received at the second mobile station and a determination is made if the second mobile station is contributing to the interference at the first mobile station. A reply message is then transmitted from the second mobile station to the first mobile station using the second mode of communication if the second mobile station is the interfering station. The reply message is forwarded from the first mobile station to the first base station where the first base station to the second base station communicate an interference mitigation message. Finally, the transmission characteristics of the second mobile station may then be altered based upon instructions from the second base station.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A system for minimizing inter-communications system mobile-to-mobile station interference comprising:
   a plurality of base stations;
   a plurality of mobile stations each communicating with a base station using a first mode of communication; and
   wherein a first mobile station upon detecting interference with at least one second mobile station sends a message using a second mode of communication to determine the source of the interference, the at least one second mobile station transmitting an identification message to the first mobile station identifying itself as an interfering mobile station, the first mobile station communicating with a first base station the identity of the interfering mobile station, and the first base station communicating with a second base station over a backhaul network for altering transmission characteristics of the second mobile station based upon instructions from the second base station.

2. A system for minimizing inter-communications system mobile-to-mobile station interference as in claim 1 wherein the second mode of communication uses a WiFi or Bluetooth protocol.

3. A system for minimizing inter-communications system mobile-to-mobile station interference as in claim 1, wherein an interfering station receiving the message mitigates the interference by performing at least one mitigating function from the group of altering its transmission time, frequency channel, transmission power and altering its modulation and coding scheme (MCS).

4. A method for minimizing inter-communications system mobile-to-mobile station interference as in claim 1, wherein the plurality mobile stations are cellular telephone devices.

5. A method for minimizing inter-communications system mobile-to-mobile station interference comprising the step of:
   providing a plurality of mobile stations and at least a first base station and second base station utilizing a first mode of communications;
   detecting a predetermined level of interference at a first mobile station in a first network;
   transmitting a query message from the first mobile station using a second mode of communication;
   receiving the query message at a second mobile station in a second network;
   determining if the second mobile station is contributing to the interference at the first mobile station;
   transmitting a reply message from the second mobile station to the first mobile station using the second mode of communication if the second mobile station is the interfering station;
   forwarding the reply message from the first mobile station to the first base station;
   communicating from the first base station to the second base station an interference mitigation message; and
   altering transmission characteristics of the second mobile station based upon instructions from the second base station.

6. A method for minimizing inter-communications system mobile-to-mobile station interference as in claim 5, wherein the first communications mode includes at least one of code division multiple access (CDMA), time division multiple access (TDMA) or Orthogonal Frequency Division Multiplexing Access (OFDMA).

7. A method for minimizing inter-communications system mobile-to-mobile station interference as in claim 5, wherein the first base station communicates with the second base station using a back haul network.

8. A method for minimizing inter-communications system mobile-to-mobile station interference as in claim 5, wherein the transmission characteristics include at least one from the group of transmission time, frequency channel, transmission power and modulation and coding scheme (MCS).

9. A method for minimizing inter-communications system mobile-to-mobile station interference as in claim 5, wherein the second mode of communication uses a WiFi communications standard.

10. A method for minimizing inter-communications system mobile-to-mobile station interference as in claim 5, wherein the second mode of communication uses a Bluetooth communications standard.

11. A method for minimizing inter-communications system mobile-to-mobile station interference as in claim 5, wherein the mobile stations are cellular telephone devices.

12. A method of mitigating interference between mobile stations communicating in separate communications networks comprising the steps of:
   detecting interference at a first mobile station in a first communications network using a first communications mode;
   broadcasting a query message from the first mobile station using a second communications mode;
   receiving the query message at at least one second mobile station using a second communications network;
   determining at the at least one second mobile station whether the second mobile station is causing the interference;
   transmitting an interference acknowledgment message from the at least one second mobile station to the first mobile station using the second communication mode;
   communicating from the first communications network to a second communications network via a backhaul connection a message identifying the second mobile station as an interfering station; and
   altering transmission characteristics of the second mobile station by the second based upon instructions from the second base station.

13. A method of mitigating interference between mobile stations as in claim 12, wherein the first communications mode is one of the group of code division multiple access (CDMA), time division multiple access (TDMA) or Orthogonal Frequency Division Multiplexing Access (OFDMA).

14. A method of mitigating interference between mobile stations as in claim 12, wherein the second mode of communication uses a WiFi communications standard.

15. A method of mitigating interference between mobile stations as in claim 12, wherein the second mode of communication uses a Bluetooth communications standard.

16. A method of mitigating interference between mobile stations as in claim 12, wherein the transmission characteristics include at least one from the group of transmission time, frequency channel, transmission power and modulation and coding scheme (MCS).

17. A method of mitigating interference between mobile stations as in claim 12, wherein the mobile stations are cellular telephone devices.

* * * * *

UNITED STATES PATENT AND TRADEMARK OFFICE
CERTIFICATE OF CORRECTION

| | | |
|---|---|---|
| PATENT NO. | : 7,860,521 B2 | Page 1 of 1 |
| APPLICATION NO. | : 11/964386 | |
| DATED | : December 28, 2010 | |
| INVENTOR(S) | : Chen et al. | |

It is certified that error appears in the above-identified patent and that said Letters Patent is hereby corrected as shown below:

Title Page, Item (57), under "ABSTRACT", in Column 2, Line 12, delete "back haul" and insert -- backhaul --, therefor.

IN THE SPECIFICATION

In Column 2, Line 25, delete "Intersystem" and insert -- Inter-system --, therefor.

In Column 4, Line 3, delete "(TDMA GSM/GPRS)" and insert -- (TDMA, GSM/GPRS) --, therefor.

IN THE CLAIMS

In Column 7, Line 34, in Claim 4, delete "method" and insert -- system --, therefor.

In Column 8, Line 4, in Claim 7, delete "back haul" and insert -- backhaul --, therefor.

Signed and Sealed this
Nineteenth Day of June, 2012

David J. Kappos
*Director of the United States Patent and Trademark Office*